United States Patent
Wallace

[11] 3,785,080
[45] Jan. 15, 1974

[54] HOLDER FOR FISHING LEADERS

[76] Inventor: Maynard Wallace, 38172 Seaway Dr., Mt. Clemens, Mich. 48073

[22] Filed: Nov. 22, 1972

[21] Appl. No.: 308,758

[52] U.S. Cl. .......................... 43/54.5 R, 43/57.5 R
[51] Int. Cl. .......................................... A01k 97/06
[58] Field of Search ................. 43/54.5 R, 54.5 A, 43/57.5 R, 57.5 A, 25.2; 46/1 A

[56] References Cited
UNITED STATES PATENTS

| 2,595,463 | 5/1952 | Kamps | 43/57.5 R |
| 2,601,736 | 7/1952 | Fisher | 43/54.5 R X |
| 2,749,654 | 6/1956 | Harris | 43/57.5 R |
| 2,491,404 | 12/1949 | Winnemore | 46/1 A |
| 2,730,833 | 1/1956 | Newell | 43/57.5 R |

Primary Examiner—Louis G. Mancene
Assistant Examiner—J. N. Eskovitz
Attorney—J. King Harness et al.

[57] ABSTRACT

A flat rectangular panel with pairs of aligned notches in its opposite edges for winding and storing fishing leaders. Rows of holes are formed in the panel, and slotted plugs can be placed over the leader ends and snapped into the holes to hold the leaders in place. In a modified form of the invention, a third set of notches is provided for holding hooks at the ends of the leaders.

10 Claims, 8 Drawing Figures

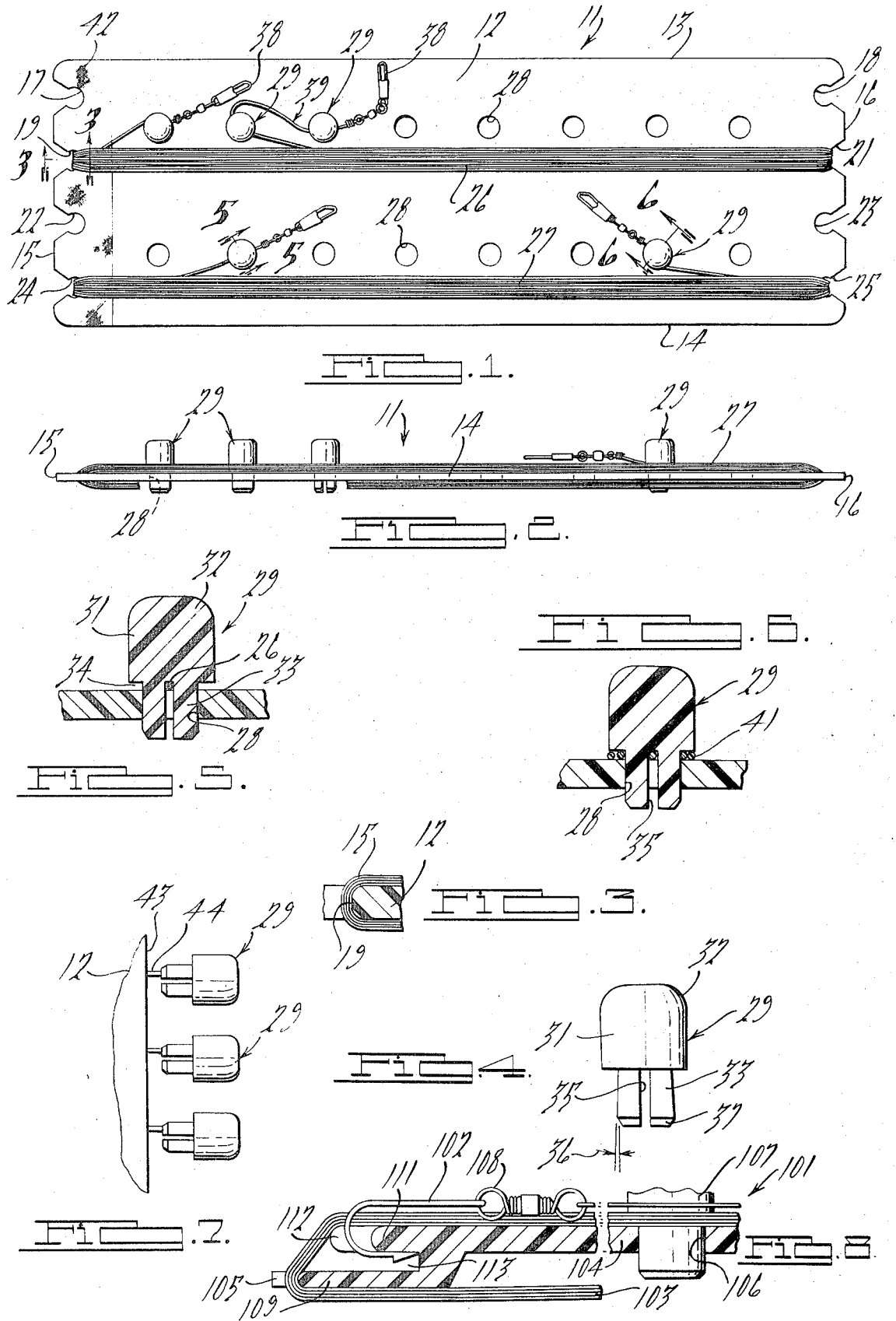

HOLDER FOR FISHING LEADERS

BACKGROUND OF THE INVENTION

The invention relates to fishing leaders, that is, lines used to attach the end of a fishline to the lure or hook. Some types of fishing leaders, such as those used for deep sea trolling, are quite lengthy and if improperly stored can become entangled and difficult to prepare for use.

BRIEF SUMMARY OF THE INVENTION

An object of the present invention is to provide a novel and improved holder for relatively long fishing leaders which will do away with the problem of entanglement mentioned above and will enable the angler to store and use the leader with a minimum of difficulty.

It is a further object to provide a holder of this type which is sturdy and compact, and permits a number of leaders to be stored at the same time, with the leaders being easily identified and accessible for immediate use without becoming misplaced.

It is also an object to provide a novel fishing leader holder as above described which is useful for different lengths of fishing leaders and can also be used as a scale during angling.

It is a further object to provide a holder of this type which can be fabricated by simple molding methods. any Briefly, the invention comprises a flat rectangular panel with pairs of aligned notches at its opposite short edges on which a plurality of fishing leaders can be wound. Between these notches are arranged rows of apertures, and plugs are provided having slots which will fit over the ends of the leaders, the plugs being uniquely shaped so as to snap into the holes. The holes are equidistantly spaced at increments such as 1 inch which will match the normal size variations of the leaders. If necessary, a plug may be rotated after being snapped into its hole to wind up any excess. The invention may be simply fabricated by molding the panel and plugs together so that the assembly may be sold as a package with the plugs later separated from the panel by the user.

In another embodiment, a third set of notches is provided for returning hooks at the ends of the leaders in a protected manner.

BRIEF DESCRIPTION OF THE DRAWINGS

FIG. 1 is a plan view of the holder of this invention.
FIG. 2 is a side elevational view thereof.
FIG. 3 is an enlarged fragmentary cross-sectional view in elevation taken along the line 3—3 of FIG. 1 showing the rounded nature of the notches.
FIG. 4 is an enlarged side elevational view of one of the plugs.
FIG. 5 is a fragmentary cross-sectional view in elevation taken along the line 5—5 of FIG. 1 and showing how a plug retains a leader.
FIG. 6 is an enlarged fragmentary cross-sectional view in elevation taken along the line 6—6 of FIG. 1 and showing how a plug may be rotated to wind up the excess of a leader.
FIG. 7 is a fragmentary plan view showing a portion of an injection molding of the panel and plugs; and
FIG. 8 is a fragmentary side elevational view in cross section of a modified form of the invention in which a hook at the end of the leader is held and protected.

DESCRIPTION OF THE PREFERRED EMBODIMENTS

The fishing leader holder is generally indicated at 11 and comprises a panel 12 of generally rectangular shape, having a pair of parallel long edges 13 and 14 and short edges 15 and 16. The panel may be fabricated of any suitably rigid material which is not subject to damage due to water exposure and is otherwise durable when subjected to its intended use. By way of example, the panel may be fabricated of any one of a number of known clear or colored plastics.

Edges 15 and 16 are provided with a plurality of pairs of opposed notches. In the illustrated embodiment, four pairs are shown, these being indicated at 17 and 18, 19 and 21, 22 and 23, and 24 and 25. The notches are sufficiently deep to accommodate the fishing leaders, two such leaders 26 and 27 being shown in the drawings. These leaders for certain types of fishing, such as deep sea trolling, are typically 15 or 16 feet in length.

The shape of notches 17 through 25 may take any of various forms, the edges of the notches being rounded as seen in FIG. 3 to prevent kinking of the leaders when they are stored.

A plurality of rows of apertures 28 are provided in panel 12, the rows being disposed between pairs of aligned notches. In the illustrated embodiment, with four pairs of notches, two rows of holes 28 are provided, each row being disposed between two pairs of notches.

A plurality of plugs generally indicated at 29 are provided for insertion in holes 28 so that the leader ends may be secured to the panel. Each plug 29 has a finger gripping portion 31 of generally cylindrical shape, preferably with a rounded upper end 32. A leader holding portion 33 extends from portion 31 for insertion in a hole 28. The length of portion 33 is sufficient to pass completely through hole 28 and leave a space 34 (FIG. 5) for the end of the leader. The diameter of gripping portion 31 is sufficiently greater than that of the holding portion to permit any excess of the leader to be wound up into space 34 and possibly around the base of portion 31 when the plug is rotated.

A diametral slot 35 is provided in portion 33, the width of this slot being sufficient to accommodate the leader end. The depth of slot 35 is such that the leader will maintain space 34 between the bottom of gripping portion 31 and panel 12 when the plug is inserted. The slot also serves to provide spring-like qualities to halves of portion 33 so that it will snap into and firmly grip the hole. Preferably, portion 33 is provided with a slight flare as indicated at 36 in FIG. 4, the lower end having an interference fit with the hole with a chamfer 37 to facilitate entry.

In use, one of a leader immediately behind its swivel clasp 38 will be placed in a slot 35 of a plug 29 and the plug inserted in a hole 28. With that end of the leader firmly gripped, the leader will be wound around panel 12 in one of the two pairs of notches adjacent the hole. When the leader has been completely wound, the other end will be placed in a slot of another plug, pulled taut, and the plug inserted in the closest hole in the same row.

Leaders are normally furnished in standard lengths having even increments of, say, 1 inch. The distance between each pair of notches, and between holes 28, are such that both ends of a leader wound on the holder will be adjacent a hole 28 when the leader has been fully wound as described above. Thus, both plugs may be placed immediately inwardly of the swivel clasps 38 of the leader.

FIG. 1 illustrates a situation with respect to leader 26 of such length that both ends terminate at about the same hole. In this case, three plugs 29 will be used to permit reversal of the last portion 39 of the leader. Again, there will be no excess beyond the two plugs holding the leader ends.

FIGS. 1 and 6 also illustrate a manner in which the invention may be utilized to properly store a leader which is not of a standardized length. In this case, the plug 29 holding the right hand end of the leader is rotated in its hole, thus winding up the excess 41 in space 34 (FIG. 6).

With the arrangement shown, four leaders could be stored with each row of holes accommodating the plugs which secure the two leaders on either side. With a standardized length of panel 12, the panel may be used to measure the length of the leader when it is being wound thereon by counting the turns. To remove a leader, it is merely necessary to remove one of the plugs, store it in a vacant hole 28, unwind the leader and remove its other end from the other plug. The storage or removal of any leader will not be interfered with by any of the others, and at no time will it be possible for them to become entangled with each other or themselves.

If desired, a portion 42 of a surface of panel 12 could be roughened or otherwise treated to permit pencil markings indicating the lengths of the leaders.

A suitable method of fabricating holder 11 is to mold both the plugs 29 and panel 12 in a single operation. This is illustrated in partially schematic fashion in FIG. 7 which shows how plugs 29 could be formed outwardly of one of the side edges 43 of panel 12. The casting could be packaged and sold in this form, with the purchaser separating plugs 29 from panel 12 by breaking off runners 44.

The number of plugs 29 provided with a panel 12 could be varied to suit requirements. In a typical case, twelve plugs could be provided for a panel 12 having four pairs of notches for receiving four leaders. Thus, up to three plugs are available for storing each leader.

FIG. 8 shows a modified form of the invention generally indicated at 101 which has means for holding a hook 102 secured at one end of a leader 103. The device comprises a panel 104 of rectangular shape, with a plurality of pairs of aligned notches 105 at opposite edges of the panel. The panel also has rows of holes 106 extending between the edges, the device being provided with slotted plugs 107 of the aforementioned construction insertable in holes 106 for securing at least one end of each leader.

This modification is intended to accommodate one or more leaders which may have a hook 102 attached to one of the swivel claps 108. In such case it is desirable to secure the hook in such a way as to shield it in order to prevent injury. As shown, an end portion 109 of panel 104 is out of the plane of the remainder of the panel, and an extension 111 is formed which partially overlaps the offset portion. This extension is provided with notches 112 aligned with notches 105. Hook 102 may be inserted in a notch 112 so that the sharp end of the hook is concealed within the space 113 between extension 111 and panel end portion 109. Leader 103 may then be wound on the panel in the usual manner with its other end being secured by plug 107.

I claim:

1. A holder for fishing leaders comprising a rigid substantially flat panel, a plurality of pairs of aligned notches at opposite edges of said panel, at least one row of holes in said panel extending between said edges, and a plurality of plugs having finger gripping portions permitting the angler to grasp the plugs between two fingers and leader holding portions insertable in said holes to be frictionally held therein, said holding portions having axially extending slots for receiving the ends of a leader inwardly of its terminal connections, the finger gripping portions extending a substantial distance above said panel so that each plug may be rotated after its holding portion is inserted in a hole, whereby winding of a leader in a pair of notches, entry of the leader ends in said slots, insertion of the plugs in the holes and, if necessary, rotation of the plugs will secure the leader to the panel.

2. The combination according to claim 1, the distances between each pair of notches and between adjacent holes corresponding to standard increments in leader lengths, whereby the ends of each leader may be secured without excess extending from the plugs.

3. The combination according to claim 1, said row of holes being disposed between two pairs of notches whereby the holes may be used to secure two leaders.

4. The combination according to claim 1, the holding portion of said plug being slightly flared so as to tightly engage the hole, the outer end thereof being chamfered to facilitate entry.

5. The combination according to claim 4, the diameter of said gripping portion being sufficiently greater than the holding portion to permit at least a portion of any excess of the leader to be wound up into the space between the gripping portion and panel when the plug is rotated.

6. The combination according to claim 1, the edges of said notches being rounded whereby kinks in the wound leader will be avoided.

7. The combination according to claim 1, a portion of said panel being roughened to permit pencil markings thereon to identify the leader lengths.

8. The combination according to claim 1, the panel being rectangular, said pairs of notches being in the short edges of said panel.

9. The combination according to claim 1, further provided with an extension partially overlapping and spaced from an end portion of said panel, said extension having notches aligned with said pairs of notches, whereby a hook attached to one end of a leader may be inserted in one of said last-mentioned notches to conceal the sharp end of the hook and secure that end of the leader.

10. In a holder for fishing leaders, a rigid flat rectangular panel, four pairs of aligned notches at the opposite short edges of said panel, two rows of equidistantly spaced holes in said panel, each row being between a pair of notches, at least eight plugs of identical shape, each plug having a gripping portion adapted to be grasped by the angler's fingers and a leader holding portion of smaller diameter extending therefrom, said holding portion being so shaped as to fit firmly in any one of said holes so as to be held frictionally therein but still rotatable, and an axially extending diametrical slot in the holding portion for receiving one end of a leader, the depth of said slot being such that the leader will maintain a space between the gripping portion of the inserted plug and the panel, whereby rotation of the plug by the angler's fingers will wind an excess portion of the leader within said space, the distance between each pair of notches and between said equidistantly spaced holes being such that four leaders may be wound in said pairs of notches and their ends secured to the panel by inserting plugs in the holes with the leader in said slots.

* * * * *